United States Patent [19]
Kreft et al.

[11] Patent Number: 6,030,448
[45] Date of Patent: Feb. 29, 2000

[54] METHOD FOR PRODUCING CEMENT CLINKER

[75] Inventors: Wilfried Kreft; Martin Uhde, both of Ennigerloh; Wolfgang Rother, Oelde, all of Germany

[73] Assignee: Krupp Polysius AG, Beckum, Germany

[21] Appl. No.: 09/014,716

[22] Filed: Jan. 28, 1998

[30] Foreign Application Priority Data

Feb. 13, 1997 [DE] Germany ............... 197 05 560

[51] Int. Cl.⁷ ............................................. C04B 7/43
[52] U.S. Cl. ................... 106/739; 106/759; 106/761; 106/762
[58] Field of Search ................... 106/739, 759, 106/761, 762

[56] References Cited

U.S. PATENT DOCUMENTS

| | | | |
|---|---|---|---|
| 4,270,900 | 6/1981 | Shy et al. | 432/58 |
| 4,318,692 | 3/1982 | Hess | 432/58 |
| 4,326,845 | 4/1982 | Hess | 432/106 |
| 4,457,082 | 7/1984 | Kreft et al. | 432/58 |
| 4,507,153 | 3/1985 | Herchenbach | 432/13 |
| 4,557,688 | 12/1985 | Nielson | 432/14 |
| 4,561,842 | 12/1985 | Nielson | 432/106 |
| 4,579,526 | 4/1986 | Kreft et al. | 432/14 |
| 5,204,654 | 11/1993 | Kreft et al. | 588/205 |
| 5,259,876 | 11/1993 | Enkegaard | 106/761 |

FOREIGN PATENT DOCUMENTS

| | | |
|---|---|---|
| 3237343 | 4/1984 | Germany . |
| 4219697 | 12/1993 | Germany . |

*Primary Examiner*—Paul Marcantoni
*Attorney, Agent, or Firm*—Reising, Ethington, Barnes, Kisselle, Learman & McCulloch P.C.

[57] ABSTRACT

The invention relates to the production of cement clinker from cement raw material using a preheating zone, a calcination zone, a heating zone in which the calcined material is further heated whilst avoiding the formation of a molten phase, as well as a clinker burning zone and cooling zone from which part-quantities of the hot exhaust air are delivered as combustion air together with proportions of fuel to the clinker burning zone, the heating zone and the calcination zone. A reliable further heating while avoiding incrustations is achieved in the heating zone by constructing this zone in the manner of a flue stream reactor to which calcined material, fuel and combustion air are delivered in the lower end region of a rising first treatment zone at one point in each case and from which the heated material is precipitated essentially by the effect of gravity overlaid with centrifugal action.

10 Claims, 1 Drawing Sheet

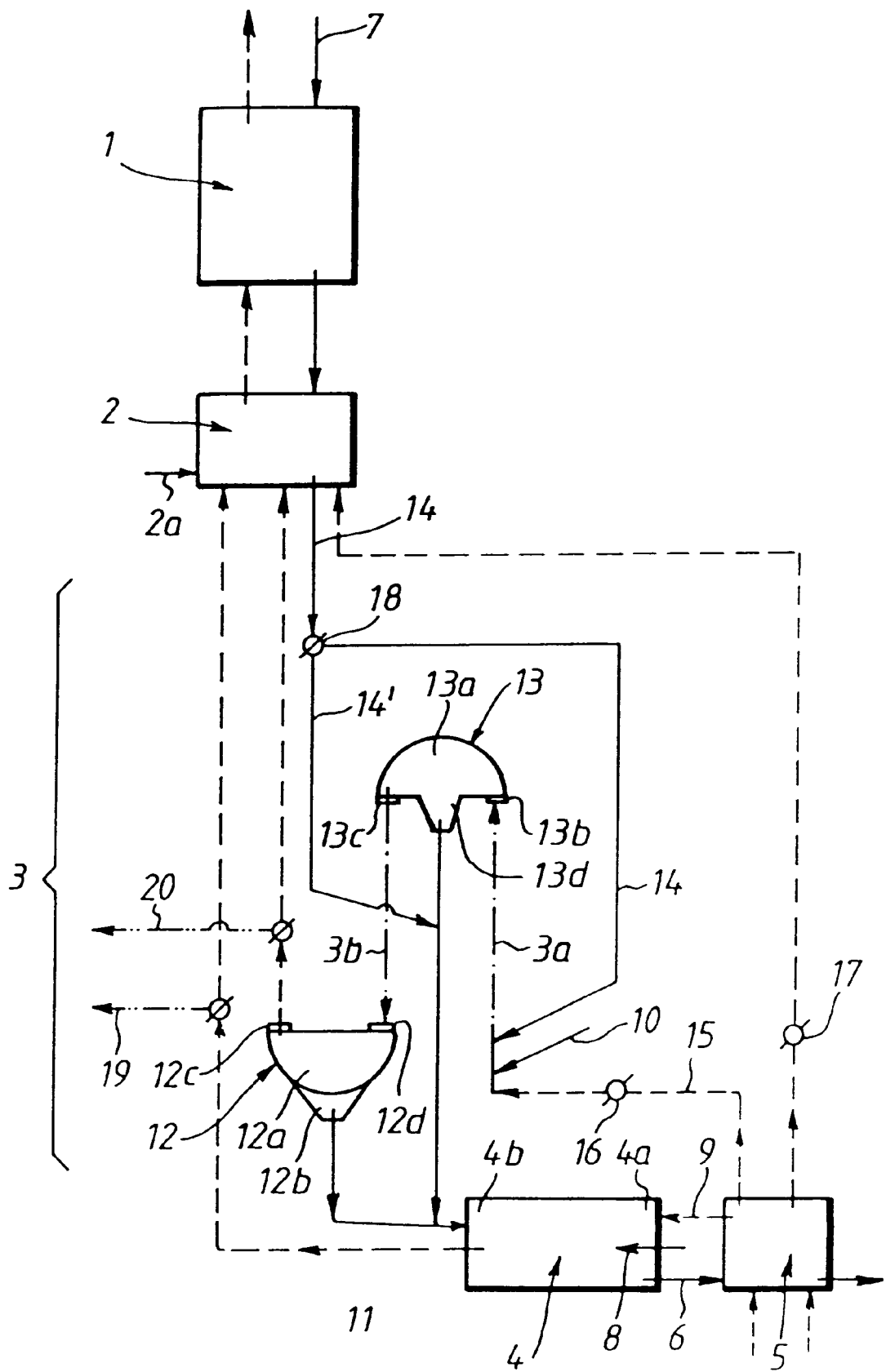

METHOD FOR PRODUCING CEMENT CLINKER

The invention relates to a method to Claim 1) and to apparatus (according to the preamble to Claim 10) for producing cement clinker from cement raw material.

BACKGROUND OF THE INVENTION

A method of producing cement clinker is known from DE-A-42 19 697 in which in a divided clinker burning zone the material, which is at least largely calcined, coming from a calcination zone is heated in a first stage up to a temperature close to the sintering temperature and undergoes final burning to clinker in a second stage, this further heating of the calcined material preferably taking place in an effervescent bed. Build-up granulation of the calcined material should be brought about simultaneously with this heating in the effervescent bed.

A method and apparatus for producing cement clinker are also known from DE-A-32 37 343. In this case a special heating assembly for the calcined material is provided between the calcination zone and the clinker burning kiln. The aim is rapid heating of the calcined material in this assembly, which is to be achieved by a plurality of fuel supply lines and/or combustion air supply lines on the heating assembly in order thereby to be able to set an adapted supply of heat. The calcined material should be heated to the temperature at which alite formation begins, which can be on average approximately 1250° C., but without bringing about the formation of quantities of melt. Several constructions can be used here as heating assemblies, such as for example a shaft-like suspension reactor which stands upright and has a pipe loop and a cyclone separator disposed on the end as well as a fluidised bed reactor with overflowing fluidised bed.

This known construction is burdened with a number of disadvantages: If the heating assembly is constructed as a substantially upright shaft-like suspension reactor, then it is preferably provided with a relatively large number of fuel and air supply points distributed over the height of the shaft, which results in not only correspondingly high construction costs but also an extremely complicated adjustment for the homogeneous temperature profile which is sought. However, if the process is operated herein near the upper temperature range, then from time to time it is not possible to prevent entirely certain partial melts from occurring, which, at least in the cyclone separator which is used as the separating arrangement, can lead to unwanted material incrustations because of the purely centrifugal separation. Furthermore a cyclone separator operates with a relatively high pressure loss. Also in the case of the fluidised bed reactor which can be used instead of the shaft-like suspension reactor it is not possible to avoid correspondingly high construction costs with the number of fuel and air supply points, since provision must be made for a uniform distribution of fuel and air over the entire cross-section of the inflow base. If an additional separating stage is likewise to be provided here for separating the heated material from the treatment gases, then particularly high pressure losses are also produced, and here too there is an increased tendency to incrustation at relatively high operating temperatures. On the other hand, if the separating stage disposed after the heating assembly is to be avoided, then the rotary kiln which forms the clinker burning kiln is operated not in counter-current flow but in co-current flow between gas and material.

The object of the invention is to provide an improved method whereby to and with great reliability whilst avoiding incrustations and with relatively low pressure loss in the heating zone.

SUMMARY OF THE INVENTION

The invention starts from considerations of optimising the process for producing cement clinker from cement raw material by further relieving the kiln containing the clinker burning zone (sintering zone) of the thermal output, i.e. taking away a proportion of the thermal work from this kiln, which has a particularly marked effect when a rotary kiln is used. In this case the clinker burning zone and accordingly also the clinker burning kiln still serve merely for the pure sintering work, whilst the heating zone provided between the calcination zone and the clinker burning zone serves for heating the calcined or at least largely calcined material to close to the sintering temperature, but below the formation of the molten phase. Thus this means that in the heating zone or heating arrangement the calcined material (cement raw meal) coming from the calcination zone/calcination apparatus is additionally subjected to a residual deacidification so long as the previously calcined material has not already been deacidified without residue, before it is then heated to a temperature at which as far as possible no molten phase occurs. The first molten phase only occurs at the beginning of the clinker burning zone (clinker burning kiln)—depending upon the material composition—at approximately 1240° C., where for instance the agglomeration of the particles of kiln feed material with one another and the further sintering to clinker takes place during the further heating of the material. Thus a primary sintering or presintering of the calcined material takes place in the heating zone—after any residual deacidification or residual calcination—relieving the clinker burning zone or the corresponding clinker burning kiln of this.

Accordingly in the method according to the invention the procedure is such that in addition to the calcined material in each case at only one point the proportion of fuel and exclusively the part-quantity of hot exhaust air from the cooling zone as combustion air are delivered to the heating zone which is operated in the manner of a flue stream treatment zone or reaction zone in the region of the lower half of the rising first treatment section. In this case, furthermore, the further heated material is precipitated out of the treatment gas stream in the separating stage of this heating zone essentially due to the effect of gravity overlaid with centrifugal action and is then introduced directly into the clinker burning zone.

In such a flue stream treatment zone (as heating zone) a particularly large space-time yield is produced to some extent, which is attributable to relatively high gas speeds (for example in the region of 15 to 30 m/s) and to a relatively short residence time of the calcined material in the treatment gas stream (for example less than approximately 3 seconds), although this gas residence time is sufficient for optimum energy transfer to the raw material in solid, powder or meal form. The reaction temperature in this heating zone which is operated as a flue stream treatment zone can be adjusted and controlled very easily and simply due to the high dissolution of solid material and intermixing in this treatment zone, so that the desired sufficient further heating of the calcined material can be ensured with great reliability. In this case it is also an advantage that the calcined material, the corresponding proportion of fuel and the part-quantity of exhaust air from the cooling zone (as combustion air) are delivered in the lower half of the rising first treatment section of the heating zone. In the release of energy due to the combustion of fuel further advantages are produced because the combustion products can be drawn off relatively quickly from the surface of the fuel and thus the burn-out can take place quickly and completely The energy released hereby is transferred spontaneously to gas and solid material, constituting the heat sink, which represents a "flameless combustion" which in contrast to an "open combustion" avoids temperature peaks and overheating. This is particularly advantageous when there is a danger that in the case of overheating partial melts or pasty phases could result on the surface of the material to be heated, which would lead to incrustations on the walls of the treatment zone.

In connection with this advantageous further heating of the calcined material in a flue stream treatment zone, a further advantage resides in the manner of separation of the further heated material from the treatment gas stream, as is proposed according to the invention, i.e. in the separating stage this material is separated from the treatment stream essentially by the effect of gravity overlaid by only a relatively small centrifugal action. If this type of material precipitation is compared with precipitation in a cyclone separator, in which therefore purely centrifugal separation takes place with relatively high centrifugal forces acting on the heated particles, then the material precipitation proposed according to the invention takes place with a relatively low pressure loss (and thus with a relatively low energy loss), and on the other hand the major advantage is achieved that incrustations on the wall Is in the actual separating region can be avoided with great reliability.

In the method according to the invention the preheated material (cement raw meal) coming from the preheating zone is further heated in the calcination zone to approximately 850 to 900° C. and thereby at least largely calcined (with a degree of deacidification of at least approximately 87 to 97%). If in this case the material coming from the calcination zone is not completely calcined, then—as already indicated above—it is first of all finally calcined in the heating zone in a first heating phase, whereupon the further heating to the desired temperature takes place, up to just below the molten phase formation in a primary sintering phase to the region of approximately 1200° C. This primary sintering or presintering phase is controlled so that as far as possible no agglomerates are formed. Also the greater proportion of heavy volatile sulphur compounds will not yet become volatile in this temperature region of approximately 1200° C., but this only occurs in the succeeding clinker burning zone, thus making possible an improved facility for removing these volatile compounds by a more targeted bypass configuration.

In this method according to the invention a sensible distribution of the total fuel and the proportionate combustion gases or combustion air over the clinker burning zone, the heating zone and the calcination zone proves particularly advantageous if the total requirement for combustion gases and fuel is delivered in proportions which can be adjusted relative to one another—in % by volume—so that approximately 20% to 30% (preferably approximately 20%) is delivered to the clinker burning zone, approximately 40 to 50% (preferably less than approximately 50%) is delivered to the flue stream treatment zone or heating zone and approximately 30 to 40% (preferably more than approximately 30%) is delivered to the calcination zone, at least the majority of the heated exhaust gases or exhaust air from the cooling zone being used—in the form of part-quantities of exhaust air—as combustion gases/combustion air.

Furthermore, according to the invention relatively high-grade fuel is delivered to the clinker burning zone, whilst relatively low-grade economical secondary fuels can be delivered to the heating zone and the calcination zone. Especially in the heating zone which is operated according to the invention in the manner of a flue stream treatment zone it has proved particularly favourable for these secondary or alternative fuels to be used partially or exclusively for combustion, since it may be regarded as relatively simple construction work to alter and adapt the length of the burn-out time of these secondary fuels by a corresponding length of the treatment or reaction sections in the heating zone.

As has already been indicated above, in this method according to the invention it has proved particularly advantageous if a relatively,short rotary kiln operating in countercurrent flow is used as the clinker burning zone, the exhaust gases therefrom bypassing the heating zone/flue stream treatment zone and being introduced into the calcination zone.

It will also be advantageous if the material further heated in the heating zone is burnt in the clinker burning zone to a free lime content of <1%.

The apparatus for producing cement clinker from cement raw material is distinguished according to the invention in that on the one hand a feed pipe for calcined material is connected to the lower half of the rising first treatment section of the heating arrangement constructed in the manner of a flue stream reactor and a fuel supply line and a branch pipe for exhaust air from the cooler as sole combustion air supply line is connected in each case to one single point, and that on the other hand the separating arrangement of the heating zone is constructed with at least one stage in such a way that the further heated material can be separated out of the treatment gas stream essentially by gravity separation overlaid with centrifugal action.

THE DRAWINGS

The drawing is a simplified schematic diagram illustrating apparatus for carrying out the method of the invention.

DETAILED DESCRIPTION

The apparatus for producing cement clinker which is illustrated in the drawing comprises—viewed in the principal flow direction of the material indicated by solid lines and arrows—a preheater (=preheating zone) preferably formed by a cyclone preheater 1, calcination apparatus (=calcination zone) 2 constructed in a usual and suitable manner, heating apparatus (=heating zone) 3 which—as will be explained in detail later—is constructed in the manner of a flue stream reactor, also a clinker burning kiln formed by a rotary kiln 4 and a cooler 5 which is connected downstream of this rotary kiln 4 and serves for cooling the burnt clinker (arrow 6) coming from the rotary kiln 4 and may be constructed in any suitable manner which is known per se, for example as a grate cooler or the like.

Before the individual devices and zones are dealt within greater detail, it should be pointed out that in the illustrated apparatus flow diagram the gas streams or gas pipes are indicated by broken lines and arrows and the gas/material suspension pipes/streams are indicated by dash-dot lines and arrows, whilst the material pipes or material streams—as already mentioned—are indicated by solid lines and arrows.

Accordingly it may be seen in the flow diagram that for the purpose of preheating the raw material (cement raw meal) which is delivered—according to the arrow 7—hot gases flow upwards through the cyclone preheater 1. These hot exhaust gases originate from the calcination apparatus 2 in which the preheated raw material is at least largely or at least almost completely calcined (deacidified). This calcination apparatus 2 is supplied on the one hand with combustion air (oxygen-rich exhaust gases) from the heating arrangement 3, with hot exhaust gases from the rotary kiln 4 and with additional fuel (arrow 2a), this being a corresponding proportion (approximately 30 to 40% by volume, preferably more than approximately 30% by volume) of the total fuel requirement of the apparatus.

The rotary kiln 4 which forms the clinker burning zone is operated in a manner which is known per se in counter-current flow between material and treatment gas, and has at its clinker outlet end 4a fuel and combustion air supply lines corresponding to the solid arrow 8 or the broken arrow 9 respectively. Relatively high-grade fuel—in a proportion of approximately 20 to 30% by volume, preferably approximately 20% by volume of the total fuel requirement—is preferably delivered to the rotary kiln 4.

In the cooler 5 the hot clinker is cooled in the usual way with the aid of cooling air delivered at several points, the hot exhaust air drawn off from this clinker 5 being delivered as part-quantities of combustion air via exhaust air branch pipes—as indicated by broken lines—to the rotary kiln 4, the heating arrangement 3 and the calcination apparatus 2.

The heating arrangement is not only supplied with combustion air but also with fuel which is delivered according to the arrow 10 and which constitutes a further proportion of the total fuel requirement of the apparatus, in fact constituting a proportion of approximately 40 to 50% by volume, preferably less than approximately 50% by volume. Thus the entire requirement of the apparatus or the corresponding method for combustion gases and fuel is distributed over three zones (4, 3, 2) in an advantageous manner.

As has already been explained above, particular importance attaches to the construction of the heating zone or heating apparatus 3 in the apparatus and to the method which can be carried out therewith.

This heating zone 3 is generally equipped with rising and descending treatment sections as well as a separating apparatus which is connected via a material discharge pipe 11 to the inlet end 4b of the rotary kiln 4. This heating apparatus 3 is constructed in the manner of a flue stream reactor (=flue stream treatment zone/reaction zone) and comprises—as indicated by dash-dot lines—a rising first treatment section (reaction section) 3a, a descending second treatment section (reaction section) 3b as well as a separating apparatus having at least one stage; in the illustrated example of the apparatus the separating zone contains two separating stages, namely a lower separating stage 12 and an additional upper separating stage 13.

The connection points for the feed pipe 14 for the calcined material, the fuel supply line (arrow 10) and the cooling air branch pipe 15 are disposed separately from one another on the lower half, preferably on the lower end portion—as illustrated in the flow diagram—of the rising first treatment section 3a of the heating arrangement 3, the branch pipe for the exhaust air from the cooler or the tertiary air pipe 15 being provided as sole combustion air supply line for the heating arrangement 3.

Each separating stage 12, 13 of the separating apparatus in the heating apparatus is generally constructed so that the further heated material is separated out of the treatment gas stream essentially by gravity separation overlaid with (slight) centrifugal action. If in this connection the lower separating stage 12 provided at the end of the actual heating zone (heating zone 3) is considered, then it may be seen even with the schematic representation of the flow diagram that the descending second treatment section 3b with its lower end opens from above into a spatially widened deflecting section 12a of the lower separating stage 12 which is formed by a type of inertial separator which also has a lower discharge hopper 12b for the heated material which is precipitated essentially by gravity as well as an upper gas discharge connection 12c for treatment gas separated off from the material. In this case the deflecting section 12a encloses an arc of at least approximately 120°, and according to the schematic representation in the flow diagram the arc is so great that the treatment gas stream in this lower separating stage 12 is deflected by approximately 180°, so that the treatment gas which is largely freed of material can flow on upwards in the direction of the calcination apparatus 2. Accordingly the intake connection 12d of the second treatment section 3b and the discharge connection 12c are provided on the ends of the arc of this deflection section 12a which are opposite one another and are essentially directed upwards. It should also be mentioned that the spatially widened deflecting section 12a forms a widened separating part in such a way that the gravity separation of the heated material out of the treatment gas stream essentially takes place there.

The upper separating stage 13, which connects the upper ends of the rising first treatment section 3a and the descending second treatment section 3b and accordingly is formed by a second separator approximately in the form of an inertial separator, also operates essentially according to the same principle as the lower separating stage 12. In contrast to the lower separating stage 12, however, the upper separating stage 13 serves to deflect the treatment gas/material suspension rising in the first treatment section 3a by approximately 180° into the descending second treatment section 3b and at the same time to precipitate a corresponding proportion of heated material (generally a proportion of coarser material). The upper separating stage 13 accordingly comprises a spatially widened deflecting section 13a having an upper deflection arc of approximately 180° and with downwardly directed connections 13b, 13c for the two treatment sections 3a and 3b respectively and with a lower material outlet hopper 13d which is connected to the material discharge pipe 11 and thus to the inlet end 4b of the rotary kiln 4.

Thus in this embodiment in the connection between the rising first treatment section 3a and the descending second treatment section 3b of the heating arrangement 3 a first partial separation is carried out in the upper separating stage 13 with a deflection of the flow of approximately 180° and at the lower end of the descending treatment section 3b a further material precipitation (principal separation) is carried out in the lower separating stage 12, the precipitated heated material from both separating stages being introduced directly into the rotary kiln 4 and the treatment gas stream separated off from the heated material being delivered to the calcination apparatus 2 with a gas flow directed essentially upwards. In this case it may also be preferable for this rising treatment gas stream to be previously brought together with the exhaust gases from the rotary kiln 4 which are likewise streaming upwards.

In so far as the construction of the two treatment sections 3a, 3b of the heating arrangement 3 is concerned, these can be formed by suitable tubular treatment channels, wherein—as indicated purely schematically in the flow diagram—the appertaining cooling air branch pipe 15 opens directly into the lower end of the rising first treatment section 3a or of the treatment channel which forms it, whilst the connection point for the feed pipe 14 for the calcined material and the fuel supply line 10 are disposed above this opening point.

As is indicated at 16 and 17, adjusting flaps or valves can be provided in the cooling air branch pipes in order to be able to adjust the corresponding part-quantities of cooling air.

It may also be advantageous if in the material feed pipe 14 leading from the calcination zone 2 to the heating zone 3 there is disposed a two-way diverter 18 of which the first way (feed pipe 14) is connected to the first treatment section 3a of the heating zone 3 and the second way thereof is connected via a bypass pipe 14' to the inlet end 4b of the rotary kiln 4. As a result in a first starting phase of the apparatus the calcined material can initially be introduced directly into the rotary kiln 4, bypassing the heating arrangement 3.

In the method according to the invention the possibility is also provided of removing unwanted volatile components from the exhaust gases from the rotary kiln 4 and/or the heating zone 3 by at least one adjustable bypass duct. Thus if during burning or heating of the calcined material unwanted volatile components occur, which can continuously increase in the circuit, then on the one hand—as indicated at 19 by dash-dot-dot lines—an adjustable part-quantity of the exhaust gases flowing off out of the rotary kiln (clinker burning zone) 4 and—as indicated at 20 by dash-dot-dot lines—likewise an appropriate part-quantity from the gas stream flowing from the lower separating stage 12 of the heating arrangement 3 to the calcination arrangement 2 can be drawn off in each case in a bypass. As a result unwanted volatile components, such as for example alkali, alkali chlorides or alkali sulphates can be specifically removed through at least one of the bypass ducts 19 and/or 20 according to the particular process engineering requirements.

Finally it should also be pointed out that the apparatus according to the invention which is illustrated in the flow diagram does not have to be operated as a two-stage separator, but according to the particular operating conditions if need be it can also be operated with only one single separating stage, and then only with the lower separating stage 12. In such a case instead of the upper separating stage 13—as may easily be imagined without separate representation in a drawing—only a correspondingly configured curved section, approximately in the form of a pipe bend or the like, would connect the upper ends of the two treatment sections 3a and 3b to one another.

We claim:

1. A method of producing cement clinker from cement raw material comprising:
   a. delivering cement raw material to a preheating zone;
   b. heating the material in said preheating zone;
   c. delivering preheated material to a calcining zone;
   d. heating the preheated material in said calcinating zone to a partial calcining temperature of between about 850° and 900° C.;
   e. delivering partially calcined material to a heating zone having rising and descending flow sections through which said partially calcined material flows in succession;
   f. further heating partially calcined material in said heating zone to an elevated temperature of about 1200° C. but below that at which the material begins to become molten;
   g. delivering the further heated material to a burning zone;
   h. burning the further heated material in said burning zone at a temperature to form clinker;
   i. delivering clinker to a cooling zone through which cooling gas flows and is discharged therefrom as hot exhaust gas;
   j. delivering portions of hot exhaust gas and fuel to each of the burning zone, the heating zone, and the calcinating zone;
   k. delivering at least a portion of said partially calcined material and the respective portion of hot exhaust gas and fuel to the rising section of said heating zone to form a flowing treatment stream of said gas, said fuel and said portion of said partially calcined material;
   l. passing the flowing stream successively through said rising and descending sections of said heating zone while subjecting the further heated material to centrifugal and gravity forces to precipitate further heated material from said stream; and
   m. introducing the precipitated further heated material directly into said burning zone.

2. The method according to claim 1 including deflecting the treatment gas stream in each separating section of said heating zone in an arcuate region having a radius of between 120° and 180°, and precipitating the material in the arcuate region.

3. The method according to claim 2 including delivering the treatment gas stream to the calcination zone following precipitation of the material.

4. The method according to claim 1 including delivering at least a portion of the exhaust gas from the clinker burning zone to the calcination zone.

5. The method according to claim 1 including deflecting said treatment stream at the upper end of the rising section and at the lower end of the descending section of said heating zone, and precipitating material from said treatment stream at the upper end of said rising section.

6. The method according to claim 5 including adjusting the hot exhaust gas and fuel relative to one another by volume so that between about 20 and 30% of said gas is delivered to said burning zone, between about 40 and 50% is delivered to the heating zone, and approximately 30 and 40% is delivered to the calcination zone, and using at least the majority of the heated exhaust gases from the cooling zone as combustion gases.

7. The method according to claim 6 wherein the fuel delivered to the burning zone is of higher grade than the fuel delivered to the heating zone and the calcination zone.

8. The method according to claim 1 including using the rotary kiln as the burning zone and introducing exhaust gas from said burning zone into the calcination zone bypassing said heating zone.

9. The method according to claim 8 including removing unwanted volatile components from said exhaust gas and said heating zone prior to delivering said exhaust gas to the calcination zone.

10. The method according to claim 1 including burning the further heated material in the burning zone to a free lime content of <1%.

* * * * *

UNITED STATES PATENT AND TRADEMARK OFFICE
CERTIFICATE OF CORRECTION

PATENT NO. : 6,030,448
DATED : February 29, 2000
INVENTOR(S) : Wilfried Kreft et al It is certified that error appears in the above-identified patent and that said Letters Patent is hereby corrected as shown below:

Substitute the following abstract for the abstract presently of record:

-- ABSTRACT

A method of producing cement clinker from cement raw material wherein the material is delivered to a preheating zone, then to a calcination zone, and then to a heating zone in which the calcined material is further heated to a temperature slightly below that at which a molten phase is formed. The further heated material then is burned in a burning zone to form cement clinker which is delivered to a cooling zone through which part-quantities of the hot exhaust air are delivered as combustion air together with proportions of fuel to the burning zone, the heating zone and the calcination zone. A reliable further heating of the calcined material while avoiding incrustations is achieved in the heating zone by passing the exhaust gas in the manner of a flue stream reactor to which calcined material, fuel, and combustion air are

UNITED STATES PATENT AND TRADEMARK OFFICE
CERTIFICATE OF CORRECTION

Page 2 of 3

PATENT NO. : 6,030,448
DATED : February 29, 2000
INVENTOR(S): Wilfried Kreft et al

It is certified that error appears in the above-identified patent and that said Letters Patent is hereby corrected as shown below:

delivered in the lower end region of a rising first treatment zone at one point in each case and from which the heated material is precipitated essentially by gravity and centrifugal forces. --

Column 1, bridging lines 4 and 5, cancel "to Claim 1) and to apparatus (according to the preamble to Claim 10); line 65, after "whereby" cancel "to".

Column 3, line 1, after "completely" insert -- . --; line 25, change "wall Is" to -- walls --.

Column 5, line 3, change "arrangement" to -- apparatus --; line 22, change "apparatus" to -- arrangement --; line 57, change "arrangement" to -- zone --; line 58, change "apparatus" to -- arrangement --; line 59, change "apparatus" to -- arrangement --.

UNITED STATES PATENT AND TRADEMARK OFFICE
CERTIFICATE OF CORRECTION

Page 3 of 3

PATENT NO. : 6,030,448
DATED : February 29, 2000
INVENTOR(S) : Wilfried Kreft et al It is certified that error appears in the above-identified patent and that said Letters Patent is hereby corrected as shown below:

Column 7, line 6, change "zone" to -- arrangement -- (both occurrences); line 13, change "arrangement" to -- zone --.

Signed and Sealed this

Twentieth Day of March, 2001

Attest:

NICHOLAS P. GODICI

*Attesting Officer*   Acting Director of the United States Patent and Trademark Office